United States Patent
Hartmann

(10) Patent No.: US 7,617,285 B1
(45) Date of Patent: Nov. 10, 2009

(54) ADAPTIVE THRESHOLD BASED SPAM CLASSIFICATION

(75) Inventor: Al Hartmann, Round Rock, TX (US)

(73) Assignee: Symantec Corporation, Mountain View, CA (US)

(*) Notice: Subject to any disclaimer, the term of this patent is extended or adjusted under 35 U.S.C. 154(b) by 595 days.

(21) Appl. No.: 11/238,806

(22) Filed: Sep. 29, 2005

(51) Int. Cl.
*G06F 15/16* (2006.01)
*G06F 17/30* (2006.01)

(52) U.S. Cl. .................. 709/206; 709/207; 707/7

(58) Field of Classification Search ......... 709/205–207, 709/200; 707/1, 10
See application file for complete search history.

(56) References Cited

U.S. PATENT DOCUMENTS

| | | | |
|---|---|---|---|
| 6,167,434 A | 12/2000 | Pang | |
| 6,249,807 B1 | 6/2001 | Shaw et al. | |
| 6,282,565 B1 | 8/2001 | Shaw et al. | |
| 6,289,416 B1 | 9/2001 | Fukushima et al. | |
| 6,324,569 B1 | 11/2001 | Ogilvie et al. | |
| 6,487,586 B2 | 11/2002 | Ogilvie et al. | |
| 6,493,007 B1 | 12/2002 | Pang | |
| 6,546,416 B1 | 4/2003 | Kirsch | |
| 6,640,301 B1 | 10/2003 | Ng | |
| 6,643,685 B1 | 11/2003 | Millard | |
| 6,650,890 B1 | 11/2003 | Irlam et al. | |
| 6,654,787 B1 | 11/2003 | Aronson et al. | |
| 6,687,740 B1 | 2/2004 | Gough | |
| 6,691,156 B1 | 2/2004 | Drummond et al. | |
| 6,697,942 B1 | 2/2004 | L'Heureux | |
| 6,701,347 B1 | 3/2004 | Ogilvie | |
| 6,711,608 B1 | 3/2004 | Ogilvie | |
| 6,732,157 B1 | 5/2004 | Gordon et al. | |
| 6,757,713 B1 | 6/2004 | Ogilvie et al. | |
| 6,757,830 B1 | 6/2004 | Tarbotton et al. | |
| 7,089,241 B1 * | 8/2006 | Alspector et al. | 707/7 |
| 2002/0087641 A1 | 7/2002 | Levosky | |
| 2002/0138581 A1 | 9/2002 | MacIntosh et al. | |
| 2003/0149726 A1 | 8/2003 | Spear | |

(Continued)

OTHER PUBLICATIONS

CAUCE.org web pages [online] Coalition Against Unsolicited Commercial Email [retrieved Mar. 17, 2003] Retrieved from the Internet: <URL: http://www.cauce.org/about/problem.shtml> U.S.A.

(Continued)

*Primary Examiner*—Joseph E Avellino
*Assistant Examiner*—Peter Shaw
(74) *Attorney, Agent, or Firm*—Fenwick & West LLP

(57) ABSTRACT

A spam classification manager uses a dynamically adaptive decision threshold for detecting spam email messages. For each of a plurality of time periods, the spam classification manager calculates an adaptive decision threshold to use to adjudicate whether or not received email messages comprise spam. The threshold is based on ratios between clean and spam emails received in previous time periods, as well as a misclassification cost ratio. The spam classification manager determines a likelihood of each incoming email message received during the time period being spam, and adjudicates whether each message in fact comprises spam by comparing the determined likelihood to the threshold. The spam classification manager keeps track of incoming email messages received during the time period adjudicated to be spam and adjudicated to be clean, and uses that information in the calculation of adaptive thresholds for future time periods.

11 Claims, 4 Drawing Sheets

U.S. PATENT DOCUMENTS

| | | | |
|---|---|---|---|
| 2003/0167311 | A1 | 9/2003 | Kirsch |
| 2003/0191969 | A1 | 10/2003 | Katsikas |
| 2003/0200334 | A1 | 10/2003 | Grynberg |
| 2003/0220978 | A1 | 11/2003 | Rhodes |
| 2003/0229672 | A1 | 12/2003 | Kohn |
| 2003/0233415 | A1 | 12/2003 | Beyda |
| 2004/0003283 | A1 | 1/2004 | Goodman et al. |
| 2004/0024823 | A1 | 2/2004 | Del Monte |
| 2004/0054887 | A1 | 3/2004 | Paulsen et al. |
| 2004/0064734 | A1 | 4/2004 | Ehrlich |
| 2004/0068534 | A1 | 4/2004 | Angermayr et al. |
| 2004/0073617 | A1 | 4/2004 | Milliken et al. |
| 2004/0093383 | A1 | 5/2004 | Huang et al. |
| 2004/0093384 | A1 | 5/2004 | Shipp |
| 2004/0111480 | A1 | 6/2004 | Yue |
| 2004/0148330 | A1* | 7/2004 | Alspector et al. ........... 709/200 |
| 2004/0148358 | A1 | 7/2004 | Singh et al. |
| 2004/0205173 | A1 | 10/2004 | Hall |
| 2004/0267893 | A1* | 12/2004 | Lin ............................ 709/207 |

OTHER PUBLICATIONS

Outlook.spambully.com web pages [online] Spam Bully [retrieved Jan. 16, 2003] Copyright 2002, Retrieved from the Internet <URL: http://outlook.spambully.com/about.php>.

NBEC/NWOCA Anti-Spam Tools, [online] [retrieved Jul. 7, 2004] retrieved from http://home.nwoca.org, Ohio, U.S.A., Jul. 7, 2004.

Kularski, C. "Compound Procedures for Spam Control," Highland School of Technology, Gastonia, NC, U.S.A., Jan. 2004.

"Technical Responses to Spam," Nov. 2003, Taughannock Networks, Trumansburg, New York, U.S.A.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://vvww.eecs.harvard.edu/~ellard/Q-97/HTML/root/node43 on Aug. 31, 2005 U.S.A.

* cited by examiner

ADAPTIVE THRESHOLD BASED SPAM CLASSIFICATION

TECHNICAL FIELD

This invention pertains generally to computer security, and more specifically to utilizing an adaptive threshold in spam classification.

BACKGROUND

Separating spam from legitimate email typically involves a statistical analysis of each email message, to assess the likelihood of whether or not it is spam, based upon extracted message features. A spam classification program is trained by using both a spam corpus and a non-spam, or "clean," corpus to determine feature set probabilities. Pre-determined features are extracted from corpora email messages and used to train the classification engine, which becomes sensitive to relative feature differences between spam and clean training messages. Then, during execution, the spam classifier extracts features from unclassified email messages, and computes relative likelihoods that the extracted features indicate that the message is spam versus clean.

Typical classification techniques produce some form of numerically continuous likelihood ratio or spam confidence factor which contrasts the likelihood that the extracted feature vector originated from a spam message versus the likelihood that the extracted feature vector originated from a clean message. This likelihood ratio is then compared against a decision threshold to produce the final discrete classification of spam or clean. More specifically, in current practice, the email message's numerically continuous spam likelihood ratio, let's call it L(msg), is compared to the decision threshold, let's call it th, and a decision is made by a simple rule of the form:

if L(msg)>th then "msg is spam" else "msg is clean"

The decision threshold, th, may have been determined during training, or it may have been set by a user or administrator through a user interface. Either way, in current practice the threshold value is static. This is easily verified for any specific spam filter, since a given email message will always be classified by it as spam or as clean, independent of the relative mix of spam and clean email messages in the email stream being processed. This may seem intuitive, since if a human were shown a sample email message and asked if it were spam or clean, she typically would not ask to first study, say, the last thousand email messages that preceded this sample message, and then base her decision not only on the features of the sample email message, but also on the running statistics of its containing message stream.

However, it can be shown statistically that a static threshold will only produce good classification performance where the relative proportions of spam and clean email messages remain equivalently fixed. Given the various deployment environments and the variability of email message streams and spamming activity, it is very unlikely that any fixed assignment of threshold value will produce optimal or near-optimal classifications. Further, it is unlikely that a non-expert in statistical decision theory could enter an optimal threshold value, or that even an expert in statistical decision theory would have the available data to make an optimal threshold setting. It can be further shown statistically that overall better classification decisions will be made if the decision threshold accounts for the statistical properties of the email message stream being filtered.

What is needed are methods, systems and computer readable media for dynamically and automatically adjusting a spam classification decision threshold in response to varying ratios of spam and clean email in a stream. Providing this functionality would improve spam classifier performance, reduce misclassification costs, lower administrative burden, and ensure more consistent user satisfaction across diverse deployment environments of varying traffic mixes.

SUMMARY OF INVENTION

Computer-implemented methods, computer systems and computer-readable media use a dynamically adaptive decision threshold for detecting spam email messages. For each of a plurality of time periods, a spam classification manager calculates an adaptive decision threshold to use to adjudicate whether or not email messages received during that time period comprise spam. The adaptive decision threshold is based on ratios between clean and spam emails received in previous time periods, as well as a misclassification cost ratio. The spam classification manager determines a likelihood of each incoming email message received during the current time period being spam, and adjudicates whether each message in fact comprises spam by comparing the determined likelihood to the adaptive decision threshold.

The spam classification manager keeps track of incoming email messages received during the current time period adjudicated to be spam and adjudicated to be clean, and uses that information to calculate a ratio between clean and spam emails received during the current time period. That ratio is used in the calculation of adaptive decision thresholds for future time periods.

In some embodiments, to keep the adaptive decision threshold from swinging too far in either direction, the spam classification manager uses both an adaptive decision threshold and a fixed decision threshold. The spam classification manager uses the adaptive decision threshold for purposes of email message classification, but uses the fixed threshold for purposes of maintaining the counts of incoming email messages adjudicated to be spam and adjudicated to be clean.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
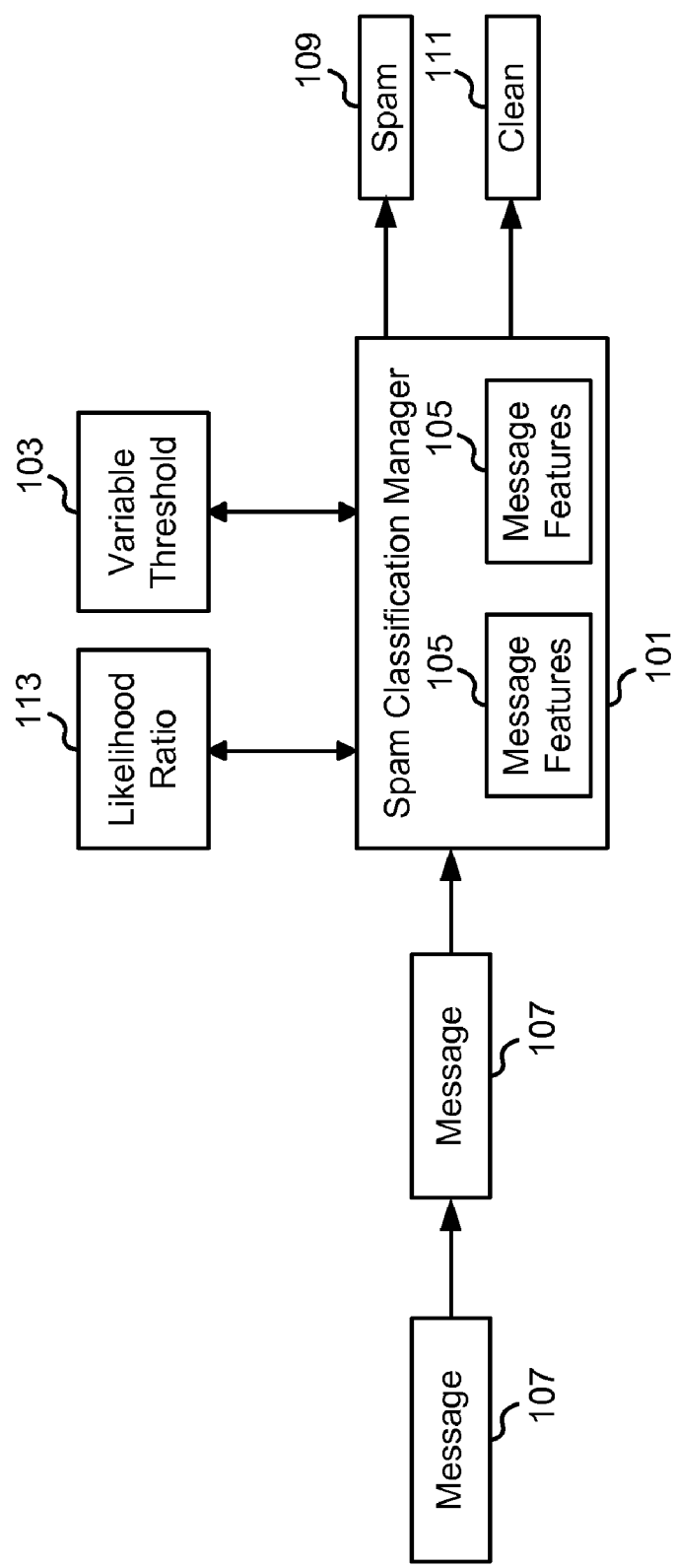
FIG. 1 is a block diagram illustrating a high level overview of a spam classification manager using a dynamically adaptive decision threshold for detecting spam email messages, according to some embodiments of the present invention.

FIG. 1 illustrates a spam classification manager 101 extracting features 105 from email messages 107 in conjunction with automatically and dynamically adjusting a spam classification decision threshold 103 based upon real time decision history, as well as some statistical background thereto, according to some embodiments of the present invention. It is to be understood that although the spam classification manager 101 is illustrated as a single entity, as the term is used herein a spam classification manager 101 refers to a collection of functionalities which can be implemented as software, hardware, firmware or any combination of these. Where a spam classification manager 101 is implemented as software, it can be implemented as a standalone program, but can also be implemented in other ways, for example as part of a larger program, as a plurality of separate programs, as one or more device drivers or as one or more statically or dynamically linked libraries.

Referring to FIG. 1, assume the spam classification manager 101 applies a test T, such as L(msg)>th, to each email message 107, and if the test succeeds (T+), classifies the message 107 as spam 109, and if the test fails (T−), classifies the message as clean 111. Let S represent spam messages 109 and C represent clean messages 111. The spam classification manager 101 training process on a training S corpus and a training C corpus attempts to maximize the two conditional probabilities p(T+|S) and p(T−|C). In spam filter parlance, p(T+|S) is termed the true positive fraction, or tpf, and p(T−|C) is the true negative fraction, tnf. Spam filter training generally attempts to minimize the two conditional probabilities p(T+|C), or false positive fraction, fpf, and p(T−|S), or false negative fraction, fnf.

At the end of training there has been constructed a classification function that takes a sample message feature vector 105 as an argument and produces a likelihood ratio 113 (or some monotonic function of the likelihood ratio). In current practice static threshold spam classification, the likelihood ratio 113 would be a probability ratio, formally p(msg|S)/p(msg|C). The likelihood ratio 113 is a quantification of the answer to the question, "How likely is this message feature vector 105 if the message 107 were spam 111, versus how likely is this message feature vector 105 if the message 107 were clean 109." Typically, the likelihood ratio 113 (or some monotonic function of it) is produced near the final stage of the classification process, the final stage being the comparison against the threshold 103.

Statistical decision theory seeks to define a decision rule such that the risk of the chosen decision is minimized. In the spam filtering problem, risk is a function of misclassification costs. Let c+ be the cost of a false positive decision and c− be the cost of a false negative decision (as explained below, the spam classification manager 101 does not need the actual costs, because it just uses the cost ratio). The risk incurred with any given decision, T+ or T−, resulting from the spam test depends on the conditional probabilities that the given message 107 being tested is either S or C. That is, it depends upon the posterior probabilities p(S|msg) and p(C|msg). With these costs and probabilities, it is possible to quantify the risks, Ro, for the spam classification manager 101 making either a T+decision or a T− decision:

$$R(T+|msg)=c+\times p(C|msg) \text{ and } R(T-|msg)=c-\times p(S|msg)$$

In other words, the risk of a positive spam test is the product of the false positive cost and the probability the given message 107 is clean 109, while the risk of a negative spam test is the product of the false negative cost and the probability the given message 107 is spam 111. If we knew these costs and probabilities, then the optimal decision rule, i.e. the rule that minimizes decision risk, could be expressed as:

choose T+ if p(S|msg)/p(C|msg)>c+/c− else choose T−

As described above, current practice static threshold spam filters compute the likelihood p(msg|S), not the necessary posterior probability p(S|msg), and also compute the likelihood p(msg|C), not the necessary posterior probability p(C|msg). But these factors are related by Bayes Rule. In various embodiments of the present invention, the spam classification manager 101 substitutes the Bayes Rule in the above decision rule and rearranges terms, obtaining an optimal decision rule taking into account its computed likelihood ratio 113. The optimal decision rule in terms of the spam classification manager 101 computed likelihood ratio 113 is:

choose T+ if p(msg|S)/p(msg|C)>(c+/c−)×(p(C)/p(S)) else choose T−

The important point to observe here is that now the decision threshold 103 is not fixed, unless the unconditional prior probability ratio p(C)/p(S) is fixed, which is typically not the case. It is not the case in general across all given mail streams, and it is not the case in general for an individual mail stream across all given time periods. Whereas in current static threshold spam filter practice an empirical threshold value 103 is chosen that in effect assigns a fixed value to the p(C)/p(S) ratio 113, according to various embodiments of the present invention, the spam classification manager 101 makes significantly improved estimates of the ratio 113, and exploits those improved estimates to minimize misclassification risk more consistently in the field.

As the ratio 113 indicates, the net effect of this decision rule is to favor a T+ decision as the spam ratio increases, and to favor a T− decision as the spam ratio declines. Therefore a given message 107 might be classified differently depending upon the statistics of the message stream with which it is associated. That message 107 classification allows far more robust performance than current practice static threshold spam classification. Also note that this variability is produced without any retraining (that would alter the likelihood ratio 113), thus it is quite different (and much simpler) than adaptive spam filters (although an adaptive spam filter could and should also utilize the current invention).

Figure 2:
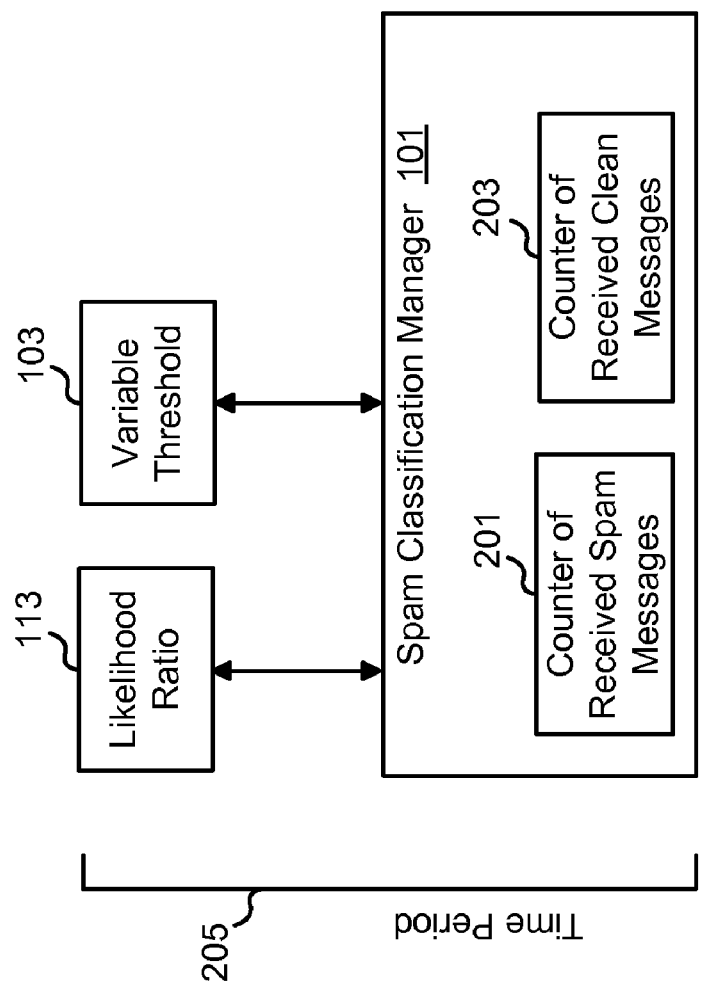
FIG. 2 is a block diagram illustrating a spam classification manager maintaining counts of spam and clean email messages received during a given time period, according to some embodiments of the present invention.

Turning now to FIG. 2, mail stream statistics in the real world are dynamic, so the decision threshold 103 should be dynamic. The decision threshold 103 should not only be dynamic, but should be automatically adjusted, and it should be adjusted in situ; not in the development lab or by a central administrator. According to various embodiments of the present invention, the spam classification manager 101 provides such functionality, by employing any one of a family of methodologies based upon local, dynamic unsupervised estimation of the unconditional probability ratio 113 p(C)/p(S). The other threshold 103 factor, the cost ratio, c+/c−, is a policy decision that can remain fixed, although in some embodiments of the present invention it too can be varied (for example if the importance of mail received during different time periods, e.g., workdays vs. non-workdays, is estimated). Dynamic cost ratios are discussed in greater detail below.

The spam categorization manager 101 makes periodic estimates of the prior probability ratio 113 p(C)/p(S). Typically, two counters 201, 203 are maintained, n+ and n−. The spam categorization manager 101 uses the counters 201, 203 to keep track of the number of positive and negative spam test results made in the most current time period 205. At the end of each time period 205, the spam categorization manager 101 compute a new estimate for p(C)/p(S) that is simply the ratio 113 n−/n+, and re-initializes the counters 201, 203 for the next time period 205. For example, if we designate the ith time period as $t_i$, and designate the counter ratio 113 for this time period as $r_i$, then we are creating a time series $r_0, r_1, \ldots, r_i, \ldots$ of ratio 113 estimates.

Various methods of time series analysis and prediction are known to those of ordinary skill in the relevant art, and can be used by the spam categorization manager 101 to develop an estimate of the ratio 113 for the current time period 205, $t_{i+1}$, from the prior time series, $r_0, r_1, \ldots, r_i$. For example, the spam categorization manager 101 can designate the prediction of $r_{i+1}$ as $\hat{r}_{i+1}$, then use $\hat{r}_{i+1}$ during the current time period 205, $t_{i+1}$, as the current estimate of p(C)/p(S) for setting of the current decision threshold 113. The prediction $\hat{r}_{i+1}$ could be as trivial as $\hat{r}_{i+1} = r_i$ or it could be a simple moving average $\hat{r}_{i+1} = (r_{i-k+1} + r_{i-k+2} \ldots + r_{i-1} + r_i)/k$ or it could be an exponential moving average $\hat{r}_{i+1} = \alpha r_i + (1-\alpha)\hat{r}_i$ (for $0 \leq \alpha \leq 1$) or it could be an autoregression $\hat{r}_{i+1} = \alpha_{i-k+1} r_{i-k+1} + \alpha_{i-k+2} \ldots + \alpha_{i-1} r_{i-1} + \alpha_i r_i$ (where the $\alpha$'s are all in the range [0,1] and sum to 1) or indeed any predictor from the vast literature on time series analysis.

In different embodiments of the present invention, the choices for time intervals 205 include real time intervals (e.g., milliseconds, seconds, minutes, hours, days, weeks, etc.) or pseudo time intervals 205 (e.g., every n messages). Real time intervals 205 can be an advantage when autoregression is used to exploit some actual time periodicity in the observed message statistics (e.g., a predictably lower p(C)/p(S) ratio 113 during weekends and holidays). Pseudo time intervals 205 have the advantage of equal sample sizes (thus perhaps more uniform variances) for the time series values.

Purely as one example of the many techniques discussed above, Table 1 illustrates a source code fragment for implementing a specific embodiment of the present invention. This example uses pseudo time intervals 205 of N messages 107, exponential averaging with parameter ALPHA ($\alpha$), misclassification cost ratio MCR (c+/c−), likelihood ratio 113 function L(msg), classification result counters nneg 201 and npos 203, running $r_i$ value r, current $\hat{r}_{i+1}$ estimate rhat, and decision threshold th 103. Input message streams are named with lexical prefix in and output message streams are named with lexical prefix out. Of course, Table 1 only illustrates an example of one way in which a particular embodiment of the present invention can be implemented. Many implementation variations are possible, and will be apparent to those of ordinary skill in the relevant art in light of this specification.

TABLE 1

```
// Initialization
float rhat = 1.0; //...or some better initial estimate
int nneg = 1, npos = 1; //...or some better initial
estimates
float r, th;
Message msg; // the message being classified
```

TABLE 1-continued

```
ifstream inMsg;
ofstream outClean, outSpam;
// Operation
for(;;) { // each time period...
    r = (npos>0? float(nneg) / npos : MAXR);
    nneg = npos = 0;
    rhat = ALPHA * r + (1.0 − ALPHA) * rhat;
    th = MCR * rhat;
    for (int n = 0; n<N; ++n) { // each message in period...
        inMsg >> msg;
        if (L(msg) > th) {
            outSpam << msg;
            ++npos;
        } else {
            outClean << msg;
            ++nneg;
        }
    }
}
```

Figure 3:
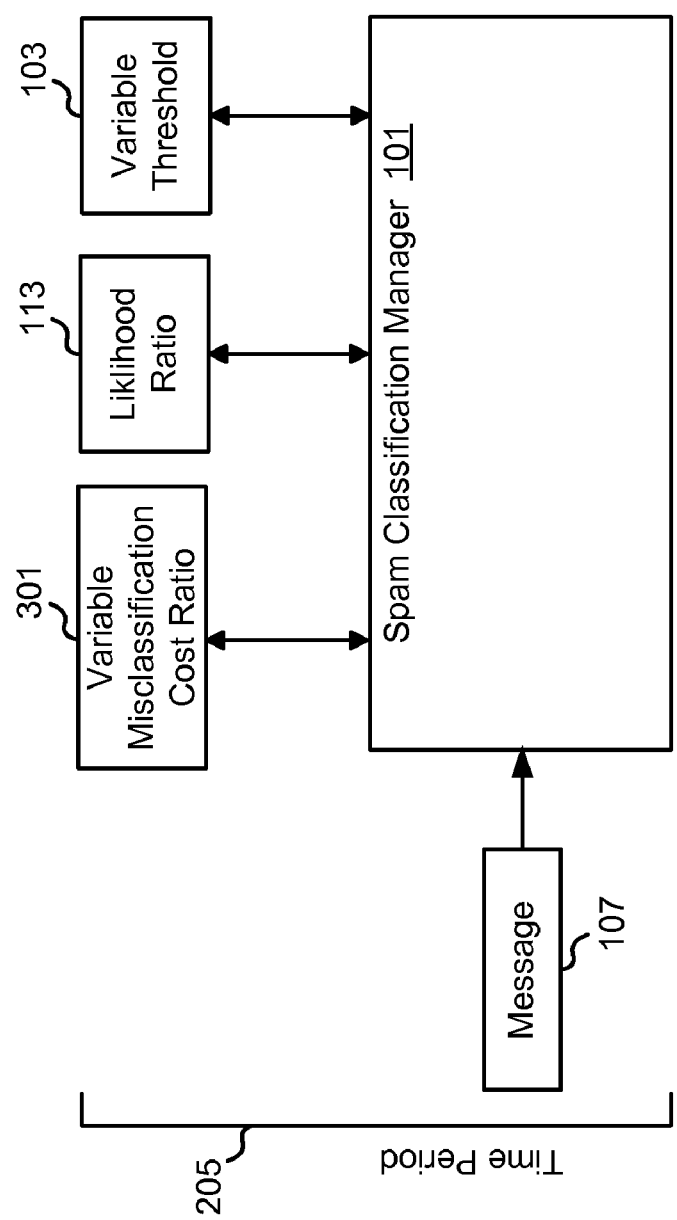
FIG. 3 is a block diagram illustrating a spam classification manager using a variable misclassification cost ratio in the calculation of a variable decision threshold, according to some embodiments of the present invention.

The example in Table 1 uses a fixed cost ratio 301, MCR, but FIG. 3 illustrates a variable misclassification cost ratio 301, mcr, which can be employed in other embodiments of the present invention. For example if it is known that more important messages 107 (with a higher value of c+) are received during certain hours or on certain days of the work week or on certain key dates (for example near the close of a month or a quarter or a fiscal year), then the misclassification cost ratio 301 can be dynamically adjusted as well using a function or lookup table.

Thus, inside the outer for-loop there would be a line such as mcr=importance(Time( )), where Time( ) returns the current real time period. The inner for-loop might then use real time rather than pseudo time, or it could continue to use pseudo time if the pseudo time periods 205 were short compared to the real time periods 205 over which the misclassification cost ratio 301 is adjusted.

Figure 4:
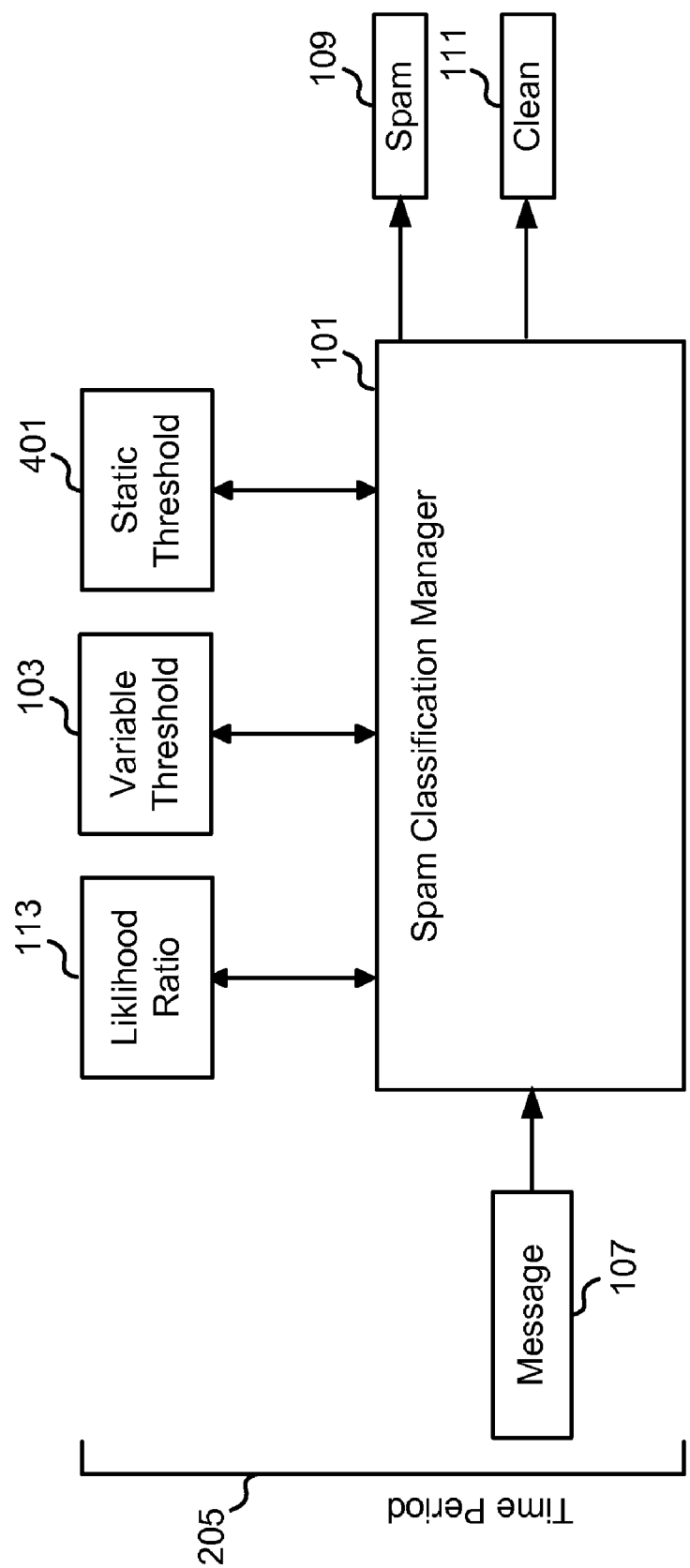
FIG. 4 is a block diagram illustrating a spam classification manager using a variable decision threshold and a fixed decision threshold to classify incoming email messages, according to some embodiments of the present invention.

Turning now to FIG. 4, another embodiment of the present invention is illustrated, in which the spam classification manager 101 uses two thresholds 103, 401, a fixed threshold 401, thfix, used for estimating the relative sizes of the spam 109 and clean 111 populations in the last group of classifications, and an adaptive threshold 103, thadapt, used for individual classifications. For each message 107 the spam classification manager 101 employees two threshold comparisons: (1) a comparison with the fixed threshold 401 to estimate the relative population sizes of spam 109 and clean messages 111, and (2) a comparison with the adaptive threshold 103 to classify the individual messages 107. This embodiment sacrifices a little bit of accuracy by using a fixed threshold 401 comparison in order to avoid the hazard of positive feedback driving the adaptive threshold 103 to an extreme value (at which point the population estimate could be even more inaccurate and never change). Because the threshold adaptation 103 is so robust, the loss of some precision on the population ratio 113 estimate is acceptable in some embodiments. A source code fragment illustrating an example implementation of such an embodiment is provided in Table 2.

TABLE 2

```
// Initialization
float rhat = 1.0; //...or some better initial estimate
int nneg = 1, npos = 1; //...or some better initial
estimates
float r, thfix = MCR, thadapt;
Message msg; // the message being classified
ifstream inMsg;
```

TABLE 2-continued

```
ofstream outClean, outSpam;
// Operation
for(;;) { // each time period...
    r = (npos>0? float(nneg) / npos : MAXR);
    nneg = npos = 0;
    rhat = ALPHA * r + (1.0 - ALPHA) * rhat;
    thadapt = MCR * rhat;
    for (int n = 0; n<N; ++n) { // each message in period
        inMsg >>msg;
        if (L(msg) > thfix) // estimate population ratio
            ++npos;
        else
            ++nneg;
        if (L(msg) > thadapt) // individual classification
            outSpam << msg;
        else
            outClean << msg;
    }
}
```

As will be understood by those familiar with the art, the invention may be embodied in other specific forms without departing from the spirit or essential characteristics thereof. Likewise, the particular naming and division of the modules, agents, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for using a dynamically adaptive decision threshold for detecting spam during a current time period, the method comprising:
    using a computer to perform steps comprising:
        calculating an estimated spam email occurrence probability for the current time period according to a statistical time series prediction methodology taking into account a previous ratio between a number of emails received in at least one previous time period adjudicated to be clean using a fixed decision threshold and a number of emails received in at least one previous time period adjudicated to be spam using the fixed decision threshold;
        calculating an adaptive decision threshold to use for the current time period to adjudicate whether emails received during the current time period are spam, the adaptive decision threshold being based on a misclassification cost ratio and the estimated spam email occurrence probability;
        determining, for each email received during the current time period, a likelihood of the email being spam;
        adjudicating whether each email received during the current time period is spam by comparing the determined likelihood of the email received being spam to the adaptive decision threshold;
        comparing, for each email received during the current time period, the determined likelihood of the email being spam to the fixed decision threshold to determine a number of emails received in the current time period adjudicated as spam and a number of emails received in the current time period adjudicated as clean; and
        calculating a current ratio between the number of emails received in the current time period adjudicated as spam using the fixed decision threshold and the number of emails received in the current time period adjudicated as clean using the fixed decision threshold, the current ratio used to calculate an adaptive decision threshold for a future time period.

2. The method of claim 1 wherein the statistical time series prediction methodology comprises one from a group of statistical time series prediction methodologies consisting of:
    calculating an arithmetic moving average based on the previous ratio;
    calculating an exponential moving average based on the previous ratio; and
    utilizing an auto-regression technique taking into account the previous ratio.

3. The method of claim 1 further comprising:
    calculating each time period as a specific duration of time, regardless of how many emails are received therein.

4. The method of claim 1 further comprising:
    calculating each time period as an interval in which a specific number of emails are received, regardless of elapsed time.

5. The method of claim 1 wherein determining a likelihood of an email received being spam further comprises:
    extracting feature vectors from the email received; and
    quantifying a likelihood of whether the email received is spam based on the extracted feature vectors.

6. The method of claim 1 further comprising:
    using a dynamic misclassification cost ratio to calculate the adaptive decision threshold for the current time period.

7. The method of claim 6 further comprising:
    adjusting the dynamic misclassification cost ratio based upon at least one factor from a group of factors consisting of:
        current time;
        current day;
        current date;
        proximity to an event;
        a running estimation of importance of prior received email messages;
        a level of expectation of important email message traffic; and
        user input.

8. A computer readable storage medium containing a computer program product for using a dynamically adaptive decision threshold for detecting spam during a current time period, the computer program product comprising: program code for performing the following steps:
    calculating an estimated spam email occurrence probability for the current time period according to a statistical time series prediction methodology taking into account a previous ratio between a number of emails received in at least one previous time period adjudicated to be clean using a fixed decision threshold and a number of emails received in at least one previous time period adjudicated to be spam using the fixed decision threshold;

calculating an adaptive decision threshold to use for the current time period to adjudicate whether emails received during the current time period are spam, the adaptive decision threshold being based on a misclassification cost ratio and the estimated spam email occurrence probability determining, for each email received during the current time period, a likelihood of the email being spam;

adjudicating whether each email received during the current time period is spam by comparing the determined likelihood of the email received being spam to the adaptive decision threshold;

comparing, for each email received during the current time period, the determined likelihood of the email being spam to the fixed decision threshold to determine a number of emails received in the current time period adjudicated as spam and a number of emails received in the current time period adjudicated as clean; and calculating a current ratio between the number of emails received in the current time period adjudicated as spam using the fixed decision threshold and the number of emails received in the current time period adjudicated as clean using the fixed decision threshold, the current ratio used to calculate an adaptive decision threshold for a future time period.

9. The computer program product of claim 8 wherein the statistical time series prediction methodology comprises one from a group of statistical time series prediction methodologies consisting of:

calculating an arithmetic moving average based on the previous ratio;

calculating an exponential moving average based on the previous ratio; and utilizing an auto-regression technique taking into account the previous ratio.

10. A computer system having a computer readable storage medium having computer program instructions embodied therein for using a dynamically adaptive decision threshold for detecting spam during a current time period, the computer program instructions comprising:

a plurality of software portions configured to perform the following steps:

calculating an estimated spam email occurrence probability for the current time period according to a statistical time series prediction methodology taking into account a previous ratio between a number of emails received in at least one previous time period adjudicated to be clean using a fixed decision threshold and a number of emails received in at least one previous time period adjudicated to be spam using the fixed decision threshold;

calculating an adaptive decision threshold to use for the current time period to adjudicate whether emails received during the current time period are spam, the adaptive decision threshold being based on a misclassification cost ratio and the estimated spam email occurrence probability;

determining, for each email received during the current time period, a likelihood of the email being spam;

adjudicating whether each email received during the current time period is spam by comparing the determined likelihood of the email received being spam to the adaptive decision threshold;

comparing, for each email received during the current time period, the determined likelihood of the email being spam to the fixed decision threshold to determine a number of emails received in the current time period adjudicated as spam and a number of emails received in the current time period adjudicated as clean; and calculating a current ratio between the number of emails received in the current time period adjudicated as spam using the fixed decision threshold and the number of emails received in the current time period adjudicated as clean using the fixed decision threshold, the current ratio used to calculate an adaptive decision threshold for a future time period.

11. The computer system of claim 10 wherein the statistical time series prediction methodology comprises one from a group of statistical time series prediction methodologies consisting of:

calculating an arithmetic moving average based on the previous ratio;

calculating an exponential moving average based on the previous ratio; and utilizing an auto-regression technique taking into account the previous ratio.

* * * * *